(12) United States Patent
Fan et al.

(10) Patent No.: US 12,435,971 B2
(45) Date of Patent: Oct. 7, 2025

(54) SAFETY MEASURING DEVICE AND SAFETY EVALUATION METHOD FOR LARGE-DIAMETER PIPELINE

(71) Applicant: NANJING HYDRAULIC RESEARCH INSTITUTE, Nanjing (CN)

(72) Inventors: Xiangqian Fan, Nanjing (CN); Jun Lu, Nanjing (CN); Lei Zhang, Nanjing (CN)

(73) Assignee: Nanjing Hydraulic Research Institute, Nanjing (CN)

( * ) Notice: Subject to any disclaimer, the term of this patent is extended or adjusted under 35 U.S.C. 154(b) by 226 days.

(21) Appl. No.: 18/332,786

(22) Filed: Jun. 12, 2023

(65) Prior Publication Data

US 2024/0068801 A1  Feb. 29, 2024

(51) Int. Cl.
| | |
|---|---|
| *G01B 11/12* | (2006.01) |
| *G01B 5/12* | (2006.01) |
| *G01B 11/16* | (2006.01) |
| *G01B 11/24* | (2006.01) |

(52) U.S. Cl.
CPC ............... *G01B 11/12* (2013.01); *G01B 5/12* (2013.01); *G01B 11/16* (2013.01); *G01B 11/24* (2013.01)

(58) Field of Classification Search
CPC .... F16H 2101/30; F16H 55/265; F16H 55/28; F16H 55/30; F16H 55/36; F16H 55/48; G01B 11/00; G01B 11/08; G01B 11/12; G01B 11/16; G01B 11/165; G01B 11/168; G01B 11/24; G01B 11/2408; G01B 11/255; G01B 5/08; G01B 5/12; G01B 5/20; G01B 5/213; G01B 5/30; G01N 2021/9542; G01N 2021/9544; G01N 2021/9546; G01N 2021/9548; G01N 21/95; G01N 21/954
See application file for complete search history.

(56) References Cited

U.S. PATENT DOCUMENTS

| | | | | |
|---|---|---|---|---|
| 5,142,990 | A * | 9/1992 | Leonard .................. | F16L 55/30 104/138.2 |
| 7,182,025 | B2 * | 2/2007 | Ghorbel .................. | F16L 55/36 104/139 |
| 10,794,161 | B2 * | 10/2020 | Durward ................ | F16L 55/30 |

(Continued)

*Primary Examiner* — John R Lee
(74) *Attorney, Agent, or Firm* — CBM PATENT CONSULTING, LLC (57) ABSTRACT

A safety measuring device for large diameter pipes includes an abutment, a rotating platform, a full-angle laser distance measuring device, a level meter, full-angle laser distance measuring device includes dial, a pointer, and a laser distance meter; the bending degree measuring device includes a high power thruster, fiber optic gyroscope, information integration, and speed sensing system; the information integration and speed sensing system are used to gather camera, optical fiber, acceleration, positioning, and other key parameters, and it can be transmitted in real-time; it also provides a safety assessment method for large-diameter pipelines, comprising: acquiring large-diameter cross-sectional deformation in different periods, comparing the cross-sectional size, axial deformation, and curving degree to assess the degree of cross-section deformation; the three indicators are taken as important indicators in the safety assessment method of large-diameter pipelines.

12 Claims, 6 Drawing Sheets

(56) References Cited

U.S. PATENT DOCUMENTS

| | | | | |
|---|---|---|---|---|
| 11,662,050 | B2* | 5/2023 | Du | F16L 55/36 73/865.8 |
| 2004/0173116 | A1* | 9/2004 | Ghorbel | F16L 55/36 73/866.5 |
| 2006/0064887 | A1* | 3/2006 | Chang | G01C 15/002 33/286 |
| 2007/0258773 | A1* | 11/2007 | Bennett | F16L 55/36 405/184.1 |
| 2018/0283147 | A1* | 10/2018 | Durward | F16L 55/30 |
| 2020/0208769 | A1* | 7/2020 | Du | F16L 55/28 |
| 2020/0209198 | A1* | 7/2020 | Phipps | G01N 29/262 |
| 2020/0256501 | A1* | 8/2020 | Louise-Alexandrine Baron | F16L 55/30 |
| 2022/0136637 | A1* | 5/2022 | Kwan | F16L 55/32 15/104.05 |
| 2023/0383891 | A1* | 11/2023 | Vehra | F16L 55/30 |
| 2024/0068801 | A1* | 2/2024 | Fan | G01B 11/12 |
| 2024/0392910 | A1* | 11/2024 | Namie | F16L 55/32 |

* cited by examiner

SAFETY MEASURING DEVICE AND SAFETY EVALUATION METHOD FOR LARGE-DIAMETER PIPELINE

CROSS-REFERENCE TO RELATED APPLICATIONS

This application claims priority to Chinese Patent Application Ser. No. CN202211018394.4 filed on 24 Aug. 2023.

TECHNICAL FIELD

The invention relates to the field of measurement technology, specifically to a safety measurement device and safety evaluation of a large-diameter pipe method.

BACKGROUND

To solve the uneven distribution of water resources between regions and promote the coordinated development of China's economy and ecology, several large-scale water diversion projects will be built or have been established by China. Most of the water transmission pipelines a buried underground and concealed works. With the increase of the excessive flow of the water transmission project, the water diversion pipeline in service is not only larger in diameter, but also the environment is getting worse and worse.

To give full play to the operational benefits of the water transfer pipeline project and ensure the safe operation of the project, it is necessary to be in service regularly. To carry out the quality inspection work, sectional deformation, as an important parameter in the quality inspection of the large-diameter pipeline, is of great significance to the engineering quality evaluation. However, for large diameter pipelines (such as more than 3 meters), it is difficult to accurately obtain section deformation in a three-dimensional space area, there is no mature equipment and method for detecting section deformation of large diameter water pipelines in service, mostly in the field detection, symbolic measure the diameter of two pipelines in service, the detection accuracy is insufficient, the error is large, so for this practical problem, the invention intends to invent a safety measuring device for running large diameter pipelines in service, used to detect the section deformation of pipelines.

SUMMARY

The object of the invention: to provide the safety measurement device and the safety evaluation method, which can easily and quickly measure the section size, axial deformation, and curvature of the large diameter pipe, accurate, reliable, low cost, and mass production.

Technical solution: A safety measuring device for a large diameter pipe of the invention includes a section size measuring device and a curvature measuring device.

The section size measuring device includes the base platform, the rotating platform is set above the base platform, the rotating platform is equipped with a full-angle laser ranging platform, the level is suspended around the platform, the full-angle laser range ranging device includes the dial, pointer and laser range finder, the laser range finder follows the pointer rotation;

The center of the dial is set with a rotating center coaxial with the rotating platform. The rotation center drives the dial to rotate with the rotating platform. The dial is also set with a pointer pointing to the scale, and a laser rangefinder is set at the connection between the pointer and the dial.

Further, the bending measuring device includes a first forward device, a second forward device and a third forward device with adjustable height, the first forward device and the second forward device are connected by a first bending connecting rod, and the second forward device, and the third forward device are connected by a second bending connecting rod; the whole device has a certain weight and does not float in the water.

The tail of the first forward device is provided with a high-power propeller, which ensures the device uniformly along the pipeline direction; the first forward device is provided with at least two fiber gyroscopes and information integration and speed sensing system; the fiber gyroscope is used to check the acceleration of the measured forward device; the information integration and speed sensing system is used to collect key parameters such as camera, optical fiber, acceleration, positioning, etc, and can be transmitted in real-time.

A locator is provided at the top of the second advanced device;

The head of the third forward device is equipped with a camera, which is a panoramic waterproof camera;

The first bending connection rod, the second bending connection rod, the high-power propeller, the optical fiber gyroscope, the locator, and the camera are respectively connected with the information integration and the speed sensing signal to realize the data input and output.

Further, the first bending connecting rod is consistent with the second bending connecting rod structure, and at least four optical fiber sensors are evenly distributed in the circumference to monitor the deformation of the connecting rod in real time; the forward device is connected to the wheel by the telescopic and remote controlled wheel lever to adjust the expansion of the ground wheel level to control the height and inclination of the forward device, while maintaining the overall stability of the device.

The present invention also provides a safety assessment method for large-diameter pipes, comprising:

To obtain the section deformation of large-diameter pipe in different periods, the reference parameters of section size, axial deformation, and curvature;

Compare the section size, axial deformation, and curvature in different periods, and evaluate the deformation degree of the section; if the pipe is a rigid material, within the safety range, the section deformation should be 0.02~0.03 times the diameter, if the pipe is chemical building materials pipeline, within the safe range, the section deformation should be 0.05 times the diameter;

To convert the internal force of the pipe according to the deformation degree of the section, the internal force of the pipe is calculated according to the strain calculation method proposed by Deyang Wang et al. The calculation formula is as follows:

$$M(\varphi) = \frac{3EI}{RD} \frac{-8\varepsilon_A r_m^2 - 6t_m r_m + \sqrt{64\varepsilon_A r_m^3 t_w + 36 t_w^2 r_m^2}}{4 r_m \varepsilon_A + 2 t_w} \cos(2\varphi) \#(47)$$

In addition, according to the pipeline safety specifications can be evaluated whether to exceed the specification limits, such as CJJ101-2016 《 Buried Plastic Water Supply Pipeline Engineering Technical Regulations》 pipeline safety specifications;

Further, the measurement method of the section size makes the following steps by using the section size measurement device:

Step 1: Locate the lowest point in the inner wall;
Step 1 is specific to the following:
a. Place the measuring device at the bottom of the pipe to ensure that all four corners of the base table are in contact with the pipe;
b. Move the device slightly, so that the bubbles of the external suspension level are in the center;
Step 2: Locate the pipe center axis;
Step 2 is specific to the following:
2.1 Turn on the laser rangefinder and adjust to the instant measurement mode;
2.2 Fixed the pointer at the 45° angle;
2.3 Manual operation will slowly rotate the rotating platform in a circle, so that the laser rangefinder reading is the minimum value;
2.4 Read the current reading of the laser rangefinder, mark it as A, then slightly adjust the rotating platform, so that the pointer is offset by plus or minus 1°, and record the current reading B and C;
When A is the minimum value, go to step 2.5;
When B or C is the minimum value, go to step 2.6;
2.5 Record that the connection between the A point and the laser rangefinder is the central axis of the pipeline;
2.6 Select the point of the minimum value and repeat steps 2.1~2.4 until the data at the central point is the minimum value to obtain the central axis of the pipeline;
Step 3: Measure the inner diameter of the vertical direction pipe;
Step 4: Measure the inner pipe diameter in the transverse direction.
Further, Step 3 is specific to the following:
3.1 Turn the pointer to the center of the dial, pointing to 90° and read the current data $R_{90}$;
3.2 Measure the distance between the laser range meter and the tube bottom x, so the vertical diameter of the pipe is:

$$R_1 = x + R_{90}$$

Further, Step 4 is specific to the following:
4.1 Adjust the pointer to the direction of 0°;
4.3 Switch laser rangefinder mode, enter intelligent measurement mode, and read the data $R_2$; $R_2$ is the transverse diameter of the pipe;
Laser rangefinder has two measurement modes, one is instant measurement mode, the other is intelligent measurement mode;
The intelligent measurement mode measures the real-time horizontal axis data, and the calculation formula is as follows:

$$R_2 = y \times \cos \alpha;$$

Further, the measurement method of axial deformation uses the axial deformation measurement device as follows:
Step 1: Locate the highest point x of the pipe section A;
a. Place the measuring device at the bottom of the pipe in pipe section A;
b. Move the device slightly, so that the bubbles of the external suspension level are in the center;
c. Turn on the laser rangefinder and adjust to the instant measurement mode;
d. Fixed the pointer at 90°;
e. Manual operation rotates the rotating platform freely, so that the laser range meter reading is the minimum value, which is the highest point of the pipe wall;
Step 2: Locate the highest point x' of the pipe section A';
Step 2 is specific to the following:
2.1: Still place the measuring device at the bottom of the pipe in pipe section A;
2.2: Move the device slightly, so that the bubbles of the external suspension level are in the center;
2.3: Turn on the laser rangefinder and adjust it to the instant measurement mode;
2.4: Hold the pointer at 45° and toward the pipe arrangement;
2.5: Manual operation will rotate the rotating platform freely, so that the laser range finder reading is the minimum value, the point is the highest point x' of the pipe section A';
2.6: Connect xx', that is, the actual direction of the pipeline, and compared with the initial direction of the pipeline, it is known whether the pipeline has axial deformation.

Further, the curvature measurement method takes the following steps using the curvature measurement device:
Step A: Start the high-power propeller to achieve uniform propulsion, and adjust the ground wheel to keep the whole measurement device stable;
Step B: Start the measurement, calculate the deflection according to the acceleration number and the curvature of the intelligent perception of the connecting rod, according to the fiber strain;
Step C: Check the deflection according to the fiber-optic gyroscope;
Step C is specific to the following:
C-1: Check the gyroscope acceleration to determine whether the acceleration changes when the connecting rod bends;
C-2: The accuracy of the results was further determined by comparing multiple gyroscope data;
Step D: According to the positioner, obtain the position where the bending occurs;
Further, step A is specifically: the bending measuring device is directly in the direction of the pipeline and placed at the bottom of the pipe, if the bending measuring device is immersed in water for more than 1 minute, and the high-power thruster is started slowly to realize the stable movement of the device in the water pipe;
Step B is specific to the following:
B-1: Rebuild the connecting rod deflection curve through the strain information of the optical fiber on the intelligent connecting rod, and take the height difference between the two ends of the connecting rod as the pipeline settlement;
B-2: The flexible curve was reconstructed as follows:

$$\begin{cases} x = O_{(i-1)x} + (\rho_{i-1} - \rho_i) \cos \theta_{i-1} + \rho_i \cos \theta \\ y = O_{(i-1)y} + (\rho_{i-1} - \rho_i) \sin \theta_{i-1} + \rho_i \sin \theta \end{cases}$$

$$(\theta_{i-1} \le \theta \le \theta_i)$$

$$\theta_i = \theta_{i-1} + \Delta\theta = \theta_{i-1} + S_i/\rho_i$$

Among them, the coordinates of the virtual center of the arc of segment I are (Oix, Oiy), and Si, $\rho_i$ and $\theta_i$ are the arc length, curvature radius, and virtual center corner of i respectively. By converting the strain of each fiber into a curve, the curvature of the connecting rod can be reconstructed;
B-3: Comparing the bending curve and the acceleration change curve, when both curves are obviously bent, the pipe is bent, and its curvature is subject to the data of the connecting rod.

Beneficial effects: The advantages of the present invention over the prior art are that:

In the section size measuring device in the present invention, is improved into a measuring device that can quickly measure the section size of a large diameter pipe, with cheap cost and high precision;

In the present invention, the bending measuring device can measure the tube easily and quickly by combining key core devices. The curvature of the road, exquisite structure, ease to carry;

The invention provides a measuring method of the section size, axial deformation, and curvature, the overall measuring step is simple, easy to operate, high promotion;

(4) The present invention creatively takes three indexes of section size, axial deformation, and curvature as important indexes in the safety evaluation method of large-diameter pipelines, and the method is safe, reliable and suitable for the safety evaluation of large-diameter pipelines.

DETAILED DESCRIPTION

The technical scheme of the invention is explained in detail in the following drawings, but the protection scope of the invention is not limited to the embodiment.

Example 1: A Safety Measuring Device for a Large-Diameter Pipe

A safety measuring device for a large-diameter pipe, including a section size measuring device and a bending measuring device;

The section size measuring device includes a base above a base provided with a rotating platform and a full-angle laser ranging device with a level hanging around the base, the full-angle laser ranging device includes a dial, a pointer, and a laser range finder, and the laser range finder rotates with the pointer;

The bending measuring device includes a first forward device, a second forward device and a third forward device. The first forward device is provided with a high-power propeller 6, which can ensure the device moves at a uniform speed along the pipeline direction; the first forward device is provided with at least two fiber gyroscopes 7 and the information integration and speed sensing system 8; the fiber gyroscope is used to check the acceleration of the measured forward device; the information integration and speed sensing system is used to collect key parameters such as camera, optical fiber, acceleration, and positioning, key parameters can be transmitted in real-time. A locator 9 is provided at the top of the second forward device; the head of the third forward device is provided with a camera 10, which is a panoramic waterproof camera. The first bending lever 5-1, the second bending lever 5-2, the high-power propeller 6, the fiber gyroscope 7, the locator 9, and the camera 10 are connected with the information set respectively. It is connected to the speed sensing system 8 signal to realize the input and output of data.

Example 2: A Safety Assessment Method for a Large-Diameter Pipe

Figure 10:
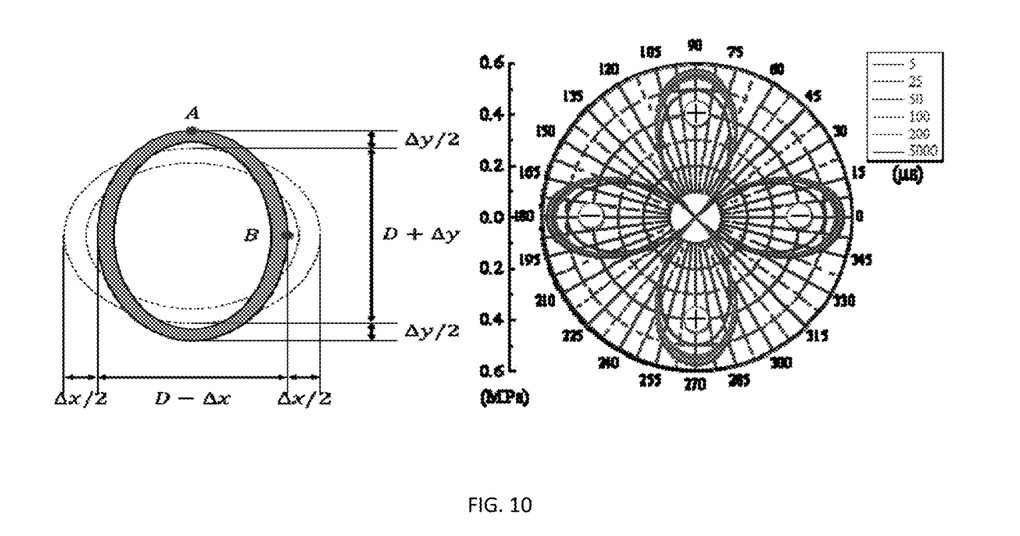
FIG. 10 shows the relationship between ellipticity and pipe bending moment.

To obtain the section deformation of large-diameter pipe in different periods, the reference parameters of section deformation include section size, axial deformation, and curvature;

Compare the section size, axial deformation and curvature of different periods, period 1 and period 2, and evaluate the deformation degree of the section; if the pipe is rigid materials, within the safety range, the section deformation at period 2 should be 0.02~0.03 times the initial pipe diameter, if the pipe is chemical building materials pipe, within the safety range, the section deformation of period 2 should be 0.05 times the initial pipe diameter;

The internal force of the pipe $M(\varphi)$ is converted according to the section deformation degree, according to CJJ101-2016 《Technical Specification for Buried Plastic Water Supply Pipeline Engineering》, measured $\sigma_m$, and compare $\sigma_m$ with $M(\varphi)$ to assess whether the specification limits are exceeded. See FIG. 10 for details.

Figure 1:
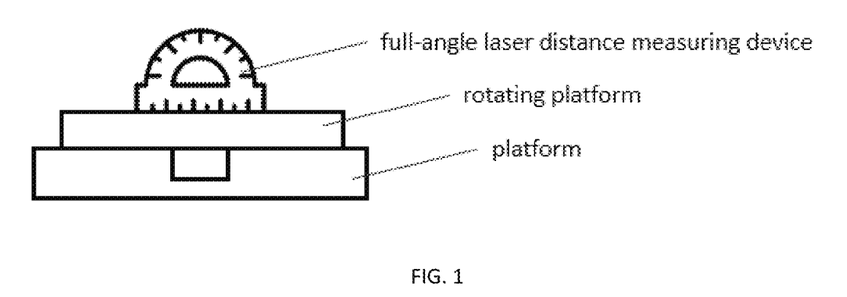
FIG. 1 is a schematic diagram of the section size measuring device in the present invention.
Figure 2:
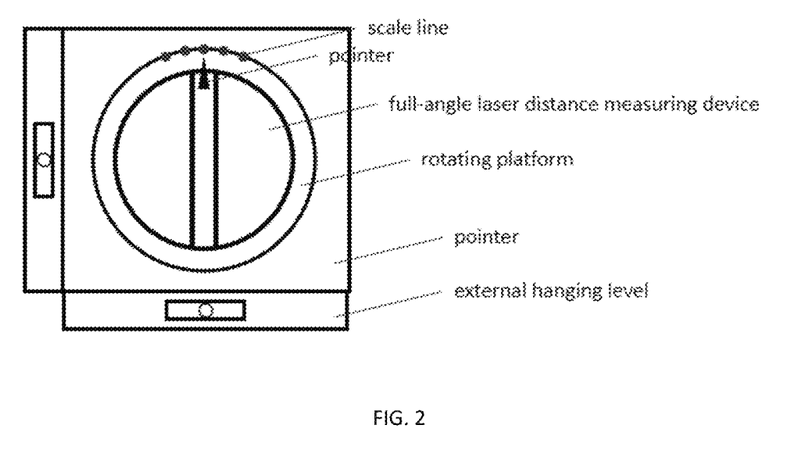
FIG. 2 is the top view of FIG. 1.
Figure 3:
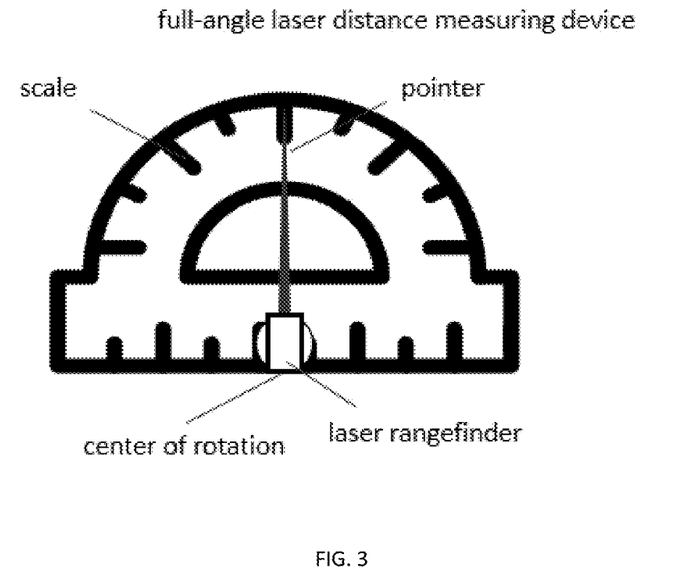
FIG. 3 is a schematic diagram of the full-angle laser ranging device in the present invention.
Figure 4:
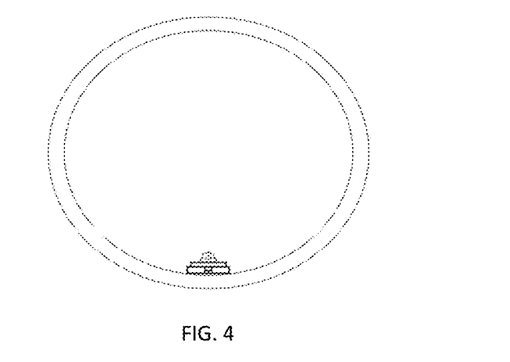
FIG. 4 is a schematic diagram of step 1 in the present invention.
Figure 5:
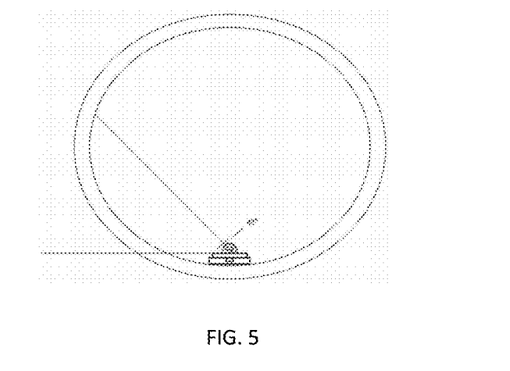
FIG. 5 is a schematic diagram of step 2 in the present invention.
Figure 6:
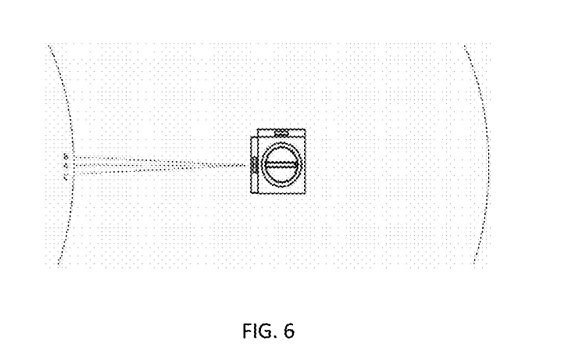
FIG. 6 is a schematic diagram of step 3 in the present invention.
Figure 7:
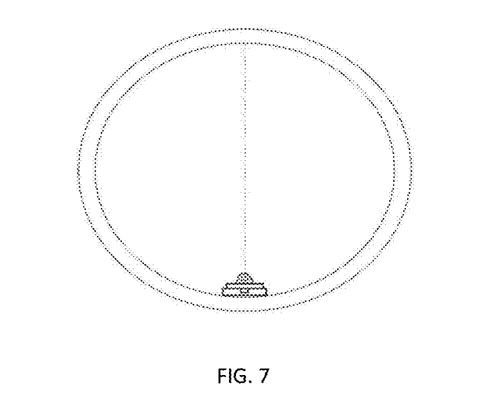
FIG. 7 is a schematic diagram of step 3 in the present invention.

Example 3: A Device for Measuring the Section Deformation of a Large-Diameter Pipe A measuring device for large-diameter pipe section deformation is shown in FIG. 1-3 includes a base 1, two rotating levels above the base, a full-angle laser ranging device 3 on the rotating platform, and a horizontal meter 4 is suspended around the base, ensuring that at least a hanging level meter 4 is provided on the front and side of the base. The full-angle laser ranging device 3 includes a dial 3-5, a pointer 3-1, and a laser rangefinder 3-4, and the laser rangefinder 3-4 rotates with the pointer 3-1.

The center of the dial is set with a rotating center coaxial with a rotating platform. The center of rotation drives the dial to rotate with the rotating platform. There is also a pointer on the dial, the pointer points to the scale 3-3, and the laser rangefinder is set at the connection between the pointer and the dial. The performance of the laser rangefinder should be at least: 10 m internal ranging error of less than 2 mm, sampling frequency of more than 20 Hz, with interface, and networking, can choose Shendawei SW-LDS100B industrial grade laser rangefinder.

Example 4: A Method for Measuring the Section Size of a Large-Diameter Pipe

Step 1: Find the lowest point of the pipe's inner wall;
Step 1 is specific to the following:
a. Place the measuring device at the bottom of the pipe to ensure that all four corners of the base table are in contact with the pipe;
b. Move the device slightly, so that the bubbles of the outer hanging level are in the center.
Step 2: Locate the pipe center axis;
Step 2 is specific to the following:
2.1 Turn on the laser rangefinder and adjust it to the instant measurement mode;
2.2 Fixed the pointer at the 45° angle;
2.3 Manual operation will rotate the rotating platform freely, so that the laser rangefinder reading is the minimum value. This step is unnecessary to be particularly accurate, and the following steps 2.4 to 2.6 are the accurate measurement stage;
2.4 Read the current reading of the laser rangefinder, record it as A, then slightly adjust the rotating platform, so that the pointer is offset by plus or minus 1°, and record the current reading, B and C respectively;
When A is the minimum value, go to step 2.5;
When B or C is the minimum value, go to step 2.6;
2.5 Record that the connection between the A point and the laser rangefinder is the central axis of the pipeline;
2.6 Select the point of the minimum value and repeat steps 2.1~2.4 until the data at the center point is the minimum value to obtain the center axis of the pipeline.
Step 3: Measure the vertical direction pipe inner diameter;
Step 3 is specific to the following:
3.1 Turn the pointer to the center of the dial, pointing to 90°, and read the current data $R_{90}$;
3.2 Measure the distance between the laser range meter and the tube bottom x, so the vertical diameter of the pipe is:

$R_1 = x + R_{90}$

Figure 8:
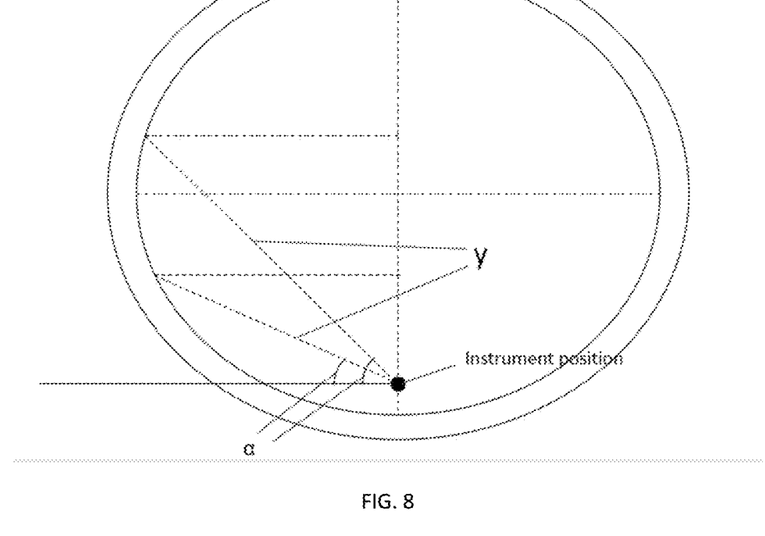
FIG. 8 is a schematic diagram of step 4 in the present invention.

Step 4: Measure the inner diameter of the transverse direction pipe;
Step 4 is specific to the following:
4.1 Adjust the pointer, point the pointer in the direction of 0°;
4.2 Switch laser rangefinder mode, enter intelligent measurement mode, and read the data $R_2$; $R_2$ is the transverse diameter of the pipe.
The laser rangefinder has two measurement modes, one is immediate measurement mode and the other is intelligent measurement mode, see FIG. 8; When the pointer angle is known and the distance between the laser rangefinder to the inner wall of the pipe, the built-in measurement module directly outputs the measurement result $R_2$ according to the following formula.
The formula is as follows:

$R_2 = y \times \cos \alpha$

Where y is the distance between the laser stadiometer to the inner wall of the pipe when the pointer angle is α.

Figure 9:
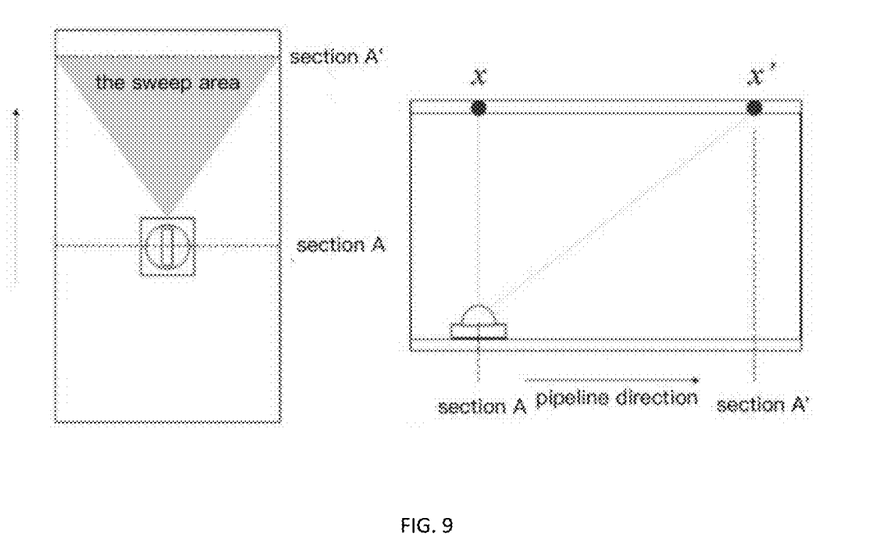
FIG. 9 is a schematic diagram of the pipeline axial deformation detection method in the present invention.

Example 5: A Measuring Method for the Axial Deformation of a Large-Diameter Pipe S1: Locate the highest point x of the pipe section A; See FIG. 9 for details;

Step 1 is specific to the following:
S1.1 Place the measuring device at the bottom of the pipe in pipe section A;
S1.2 Move the device slightly, so that the bubbles of the external suspension level are in the center;
S1.3 Turn on the laser rangefinder and adjust to the instant measurement mode;
S1.4 Hold the pointer to the 90° angle;
S1.5 Manual operation rotates the rotating platform freely, so that the laser range meter reading is the minimum value, which is the highest point of the pipe wall.
S2: Locate the highest point x' of the pipe section A';
Step 2 is specific to the following:
S2.1 Still place the measuring device at the bottom of the pipe in pipe section A;
S2.2 Move the device slightly, so that the bubbles of the external suspension level are in the center;
S2.3 Turn on the laser rangefinder and adjust to the instant measurement mode;
S2.4 Hold the pointer at 45°; toward the pipe arrangement;
S2.5 Manual operation will rotate the rotating platform freely, so that the laser rangefinder reading is the minimum value, the point is the highest x' of the pipe section A';
S2.6 Connect xx', that is, the actual direction of the pipeline, and compared with the initial direction of the pipeline, you can know whether the pipeline has axial deformation.

Example 6: A Large-Diameter Pipe Curvature-Measuring Device

Figure 11:
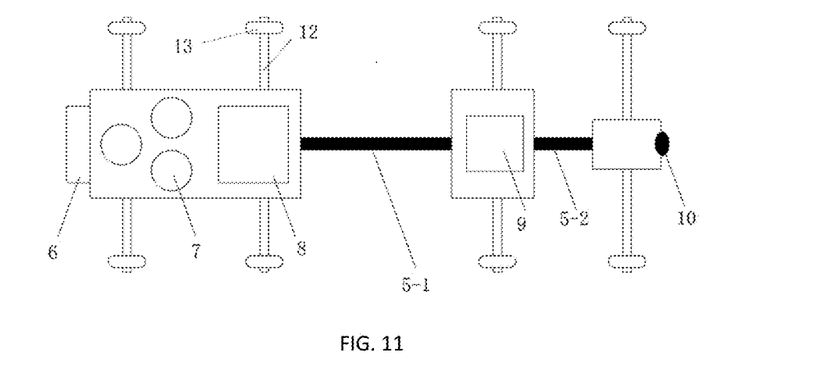
FIG. 11 is a schematic diagram of the curvature measuring device in the present invention.
Figure 12:
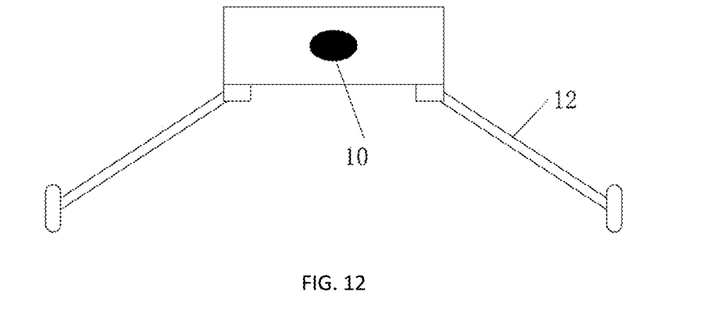
FIG. 12 is a schematic diagram of the camera shown in the present invention.
Figure 13:
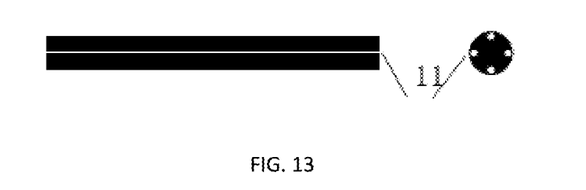
FIG. 13 is a schematic diagram of the optical fiber optic sensor in the present invention.
Figure 14:
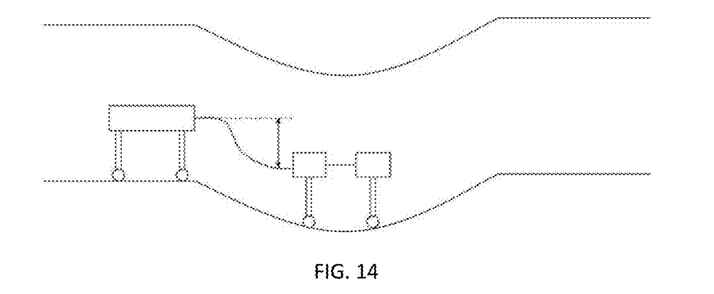
FIG. 14 is a schematic diagram of the pipeline settlement amount shown in Example 7.

A large-diameter pipe bending measuring device includes a first forward device, a second forward device, the first forward device and the second forward device connected by the first bending connecting rod 5-1, and the second forward device and the third forward device connected by the second bending connecting rod 5-2; the whole device has a certain weight and does not float in water.
The tail of the first forward device is provided with a high-power propeller 6, which can ensure the device moving uniformly along the pipeline direction; the top has at least two fiber gyroscopes 7 and the information integration and speed sensing system 8; the first forward device is used to check the acceleration of the measured forward device; the information integration and speed sensing system is used to collect key parameters such as camera, optical fiber, acceleration, positioning etc, and can be transmitted in real-time.
A locator 9 is provided at the top of the second forward device; the head of the third forward device is provided with a camera 10, which is a panoramic waterproof camera, refer to FIG. 12; the first bending connecting rod 5-1, the second bending connecting rod 5-2, the high-power propeller 6, a fiber gyroscope 7, the locator 9 and the camera 10 are connected with the information integration and speed sensing system 8 signals to realize the input and output of data. The first bending connecting rod 5-1 is consistent with the structure of the second bending connecting rod 5-2, and four fiber sensors are uniformly distributed for measuring the deformation of the connecting rod. Referring to FIG. 13, the deformation of the connecting rod is in real-time monitoring, the forward device is connected to the wheel 13 by the flexible and remote adjustable to control the height and inclination of the expansion of the wheel lever, while maintaining the overall stability of the device.

Example 7: A Method for Measuring the Curvature of a Large-Diameter Pipe

Step A: Start the high-power propeller to realize uniform propulsion. After reaching the measurement position, the regulation ground wheel will maintain the stability of the whole measurement device;

Step A is specific to the following:

The bending measurement device is directly in the direction of the pipeline and placed at the bottom of the pipe. If it is a pipe with water, immerse the bending measurement device in water for more than 1 minute, and start the high-power thruster slowly to realize the stable movement of the device in the water.

Step B: Start the measurement, calculate the deflection according to the acceleration number and the intelligent perception of the curvature of the connecting rod, according to the fiber strain;

Step B is specific to the following:
- B-1: Rebuild the connecting rod deflection curve through the strain information of the optical fiber on the intelligent connecting rod, and take the height difference between the two ends of the connecting rod as the pipeline settlement;
- B-2: The flexible curve was reconstructed as follows:

$$\begin{cases} x = O_{(i-1)x} + (\rho_{i-1} - \rho_i)\cos\theta_{i-1} + \rho_i\cos\theta \\ y = O_{(i-1)y} + (\rho_{i-1} - \rho_i)\sin\theta_{i-1} + \rho_i\sin\theta \end{cases}$$

$$(\theta_{i-1} \le \theta \le \theta_i)$$

$$\theta_i = \theta_{i-1} + \Delta\theta = \theta_{i-1} + S_i/\rho_i$$

Among them, the coordinates of the virtual center of the arc of segment I are (Oix, Oiy), and Si, $\rho_i$ and $\theta_i$ are the arc length, curvature radius, and virtual center corner of I respectively. By converting the strain of each fiber into a curve, the curvature of the connecting rod can be reconstructed;

- B-3: Comparing the bending curve and the acceleration change curve, when both curves are obviously bent, the pipe is bent, and its curvature is subject to the data of the connecting rod.

Step C: The deflection was checked according to the fiber-optic gyroscope;

Step C is specific to the following:
- C-1: Check the gyroscope acceleration to determine whether the acceleration changes when the connecting rod bends;
- C-2: The accuracy of the results was further determined by comparing multiple gyroscope data;

Step D: According to the positioner, obtain the position where the bending curves.

As described above, although the invention has been expressed and expressed with reference to particular preferred embodiments, it may not be interpreted as a limitation on the invention itself. Without departing from the spirit and scope of the present invention as defined in the attached claim, various changes may be made in forms and in detail.

What is claimed is:

1. A safety measuring device for a large diameter pipe comprising a section size measuring device and a curvature device; wherein the curvature device for measuring curved lines;

the section size measuring device includes a base; a rotating platform is arranged above the base; a full-angle laser ranging device with a level hanging is around the base, the full-angle laser ranging device includes a dial, a pointer, and a laser range finder, and the laser range finder rotates with the pointer;

a rotation center coaxial is provided at middle of the dial with the rotating platform, the rotation center coaxial drives the dial to rotate with the rotating platform, and the dial is also provided with a pointer, the pointer points to the scale, and a laser rangefinder is provided at the connection between the pointer and the dial.

2. The safety measuring device according to claim 1, wherein a bending measuring device includes a first forward device with an adjustable height, a second forward device, and a third forward device, the first forward device and the second forward device are connected by a first bending connecting rod, the second forward device and the third forward device are connected by a second bending connecting rod;

a tail of the first forward device is provided with a high-power propeller, a top of the first forward device is provided with at least two fiber optic gyroscopes and an information integration and speed sensing system;

a locator is provided at a top of a second advanced device;

a head of a third advanced device is provided with a video camera;

the first bending connecting rod, the second bending connecting rod, the high-power propeller, the optical fiber gyroscopes, the locators, and the video camera are connected with the information integration and the speed sensing system signal to realize the input and output of data.

3. The safety measuring device according to claim 2, wherein the first bending connecting rod has a same structure as the second bending connecting rod, and has at least four fiber sensors for measuring the deformation of a connecting bar are evenly distributed in circumferential direction.

4. A safety assessment method for large-bore pipes by the safety measuring device of claim 1 comprising the following steps:

obtaining a section deformation of the large diameter pipe at different periods, reference parameters of the section deformation include a section size, an axial deformation, and a curvature;

comparing the section size, the axial deformation, and the curvature in different periods, a deformation degree of the section is evaluated; if the pipe is made of rigid material, within a safety range, the section deformation should be ≤0.02~0.03 times diameter; if a pipeline is made of chemical building materials pipe, the section deformation should be ≤0.05 times the diameter; and converting an internal force of the pipeline according to the deformation degree of the section, and evaluating whether a specification limit is exceeded according to a pipeline safety specification.

5. The safety assessment method according to claim 4, wherein a measurement method of a section size takes the following steps:

Step 1: locating a lowest point of an inner wall of the pipeline inner comprising the following steps:
  1.1 placing the measuring device at a bottom of the pipeline to ensure that all four corners of a base table are in contact with the pipeline; and 1.2 moving the device slightly, so that the bubbles of the external suspension level are in the center;

Step 2: locating a central axis of the pipeline comprising the following steps:
- 2.1 turning on the laser rangefinder and adjust to an instant measurement mode;
- 2.2 fixing the pointer at 45° angles;
- 2.3 rotating manually the rotating platform for a week so that the laser range finder reading is the minimum;
- 2.4 reading a current reading of the laser rangefinder, recorded as A, then slightly adjust the rotating platform so that the pointer is offset to positive and negative 1°, and record the current readings given as B and C;
- when A is the minimum value, go to step 2.5;
- when B or C is the minimum value, go to step 2.6;
- 2.5 recording connection between an A point and the laser rangefinder as the central axis of the pipeline; and
- 2.6 selecting the point of the minimum value and repeat steps 2.1~2.4 until the data at the center point is the minimum value to obtain the central axis of the pipeline;

Step 3: measuring an inner diameter of a vertical pipeline; and

Step 4: measuring the inner diameter of the pipeline in a transverse direction.

6. The safety assessment method according to claim 5, wherein the Step 3 comprising the following steps:
- 3.1 turning the pointer to the center of the dial to 90° and read the data $R_{90}$; and
- 3.2 measuring the distance between the laser stadiometer and the bottom of the pipe x, so the inner diameter of the vertical pipeline is: $R_1 = x + R_{90}$.

7. The safety assessment method according to claim 5, wherein the Step 4 comprising the following steps:
- 4.1 adjusting the pointer to the 0° direction; and
- 4.2 switching a laser range finder mode, enter an intelligent measurement mode, and read the current data $R_2$; $R_2$ is a horizontal straight of a pipe footpath;
- the laser rangefinder has two measurement modes, one is an instant measurement mode and the intelligent measurement mode;
- the intelligent measurement mode measures a real-time horizontal axis data, and a measurement formula is as follows:

$$R_2 = y \times \cos a$$

wherein y is the distance between a laser stadiometer to the inner wall of the pipe when the pointer angle is α.

8. The safety assessment method according to claim 4, wherein a measurement of axial deformation, the measurement method comprises the following steps:

Step 1: locating the highest point x of the pipe section A comprising the following steps:
- S1.1: placing the measuring device at the bottom of the pipe in pipe section A;
- S1.2: moving the device slightly, so that bubbles of an external suspension level are in a center;
- S1.3: turning on the laser rangefinder and adjust to an instant measurement mode;
- S1.4: fixing the pointer at 90° angles; and
- S1.5: rotating manually the rotating platform so that the laser rangefinder reading is a minimum of a pipe wall culmination;

Step 2: locating the highest point x' of the pipe section A' comprising the following steps:
- S2.1: placing the measuring device at the bottom of the pipeline in pipe section A;
- S2.2: moving the device slightly, so that the bubbles of the external suspension level are in the center;
- S2.3: turning on the laser rangefinder and adjust to the instant measurement mode;
- S2.4: holding the pointer at 45° angles; toward a pipe arrangement;
- S2.5: rotating manually the rotating platform so that the laser rangefinder reading is the minimum and the point is the highest point x' of section A'; and
- S2.6: connecting xx' as the actual direction of the pipeline, and compared with an initial pipeline direction, you can know whether a pipeline axis to the deformation.

9. The safety assessment method according to claim 4, wherein the curvature measurement method comprising the following steps:

Step A: starting a high-power propeller to achieve uniform propulsion and after reaching measurement position, a regulating wheel keeps the whole measurement device stable;

Step B: starting at a curve, a flexibility, and a fiber strain;

Step C: checking a deflection according to a fiber-optic gyroscope comprising the following steps:
- Step C-1: checking the gyroscope acceleration to determine if the acceleration changes when connecting rod bends; and
- Step C-2: determining the accuracy of the results by comparing multiple gyroscope data;

Step D: obtaining the position where the bending occurs according to positioner;

wherein
- a bending measuring device includes a first forward device with an adjustable height, a second forward device, and a third forward device, the first forward device and the second forward device are connected by a first bending connecting rod, the second forward device and the third forward device are connected by a second bending connecting rod;
- a tail of the first forward device is provided with the high-power propeller, the top of the first forward device is provided with at least two fiber optic gyroscopes and an information integration and speed sensing system;
- a locator is provided at a top of the second advanced device;
- a head of the third advanced device is provided with a video camera;
- the first bending rod, the second bending rod, the high-power propeller, the optical fiber gyroscope, the locator, and the camera are connected with the information integration and the speed sensing system signal to realize the input and output of data.

10. The safety assessment method according to claim 9, wherein the curvature measurement method further comprising the following steps:

Step A comprising the following: the bending measurement device is directly in the direction of the pipeline and placed at the bottom of the pipeline; if it is a pipe with water, immerse the bending measurement device in water for more than 1 minute, and starting the high-power propeller slowly to realize the stable movement of the device in the water pipe;

Step B comprising the following:
- Step B-1: a connecting rod deflection curve is reconstructed by the strain information of an optical fiber on the connecting rod, and a height difference of the connecting rod is taken as a pipe settlement;

Step B-2: a scratching curve reconstruction is performed as follows:

$$\begin{cases} x = O_{(i-1)x} + (\rho_{i-1} - \rho_i)\cos\theta_{i-1} + \rho_i \cos\theta \\ y = O_{(i-1)y} + (\rho_{i-1} - \rho_i)\sin\theta_{i-1} + \rho_i \sin\theta \end{cases}$$

$$(\theta_{i-1} \le \theta \le \theta_i)$$

$$\theta_i = \theta_{i-1} + \Delta\theta = \theta_{i-1} + S_i/\rho_i$$

among them, the coordinates of the virtual center of the arc of segment I are (Oix,Oiy), and Si, $\rho_i$ and $\theta_i$ are the arc length, curvature radius, and virtual center corner of I respectively; by converting the strain of each fiber into a curve, the curvature of the connecting rod can be reconstructed; and Step B-3: comparing a bending curve and an acceleration change curve, when both curves are obviously bent, the pipe is bent, and its curvature is subject to the data of the connecting rod.

11. The safety assessment method according to claim 4, wherein the curvature measurement method comprising the following steps:

Step A: starting a high-power propeller to achieve uniform propulsion and after reaching the measurement position, a regulating wheel keeps the whole measurement device stable;

Step B: starting at the curve, the flexibility, and the fiber strain;

Step C: checking the deflection according to the fiber-optic gyroscope comprising the following steps:

Step C-1: checking the gyroscope acceleration to determine if the acceleration changes when connecting rod bends; and Step C-2: determining the accuracy of the results by comparing the multiple gyroscope data;

Step D: obtaining the position where the bending occurs according to the positioner;

wherein a bending measuring device includes a first forward device with an adjustable height, a second forward device, and a third forward device, the first forward device and the second forward device are connected by a first bending connecting rod, the second forward device and the third forward device are connected by a second bending connecting rod;

a tail of the first forward device is provided with a high-power propeller, a top of the first forward device is provided with at least two fiber optic gyroscopes and an information integration and speed sensing system;

a locator is provided at a top of a second advanced device;

a head of a third advanced device is provided with a video camera;

a first bending rod, second bending rod, high-power propeller, optical fiber gyroscope, locator, and camera are connected with the information integration and the speed sensing system signal to realize the input and output of data;

the first bending rod is consistent with the second bending rod structure and the first bending rod has at least four fiber sensors for measuring the deformation of the connecting bar uniformly distributed in circumference.

12. The safety assessment method according to claim 11, wherein the curvature measurement method further comprising the following steps:

Step A comprising the following: the bending measurement device is directly in the direction of the pipeline and placed at the bottom of the pipe; if it is a pipe with water, immerse the bending measurement device in water for more than 1 minute, and starting the high-power propeller slowly to realize the stable movement of the device in the water pipe;

Step B comprising the following:

Step B-1: a connecting rod deflection curve is reconstructed by the strain information of an optical fiber on the connecting rod, and a height difference of the connecting rod is taken as a pipe settlement;

Step B-2: a scratching curve reconstruction is performed as follows:

$$\begin{cases} x = O_{(i-1)x} + (\rho_{i-1} - \rho_i)\cos\theta_{i-1} + \rho_i \cos\theta \\ y = O_{(i-1)y} + (\rho_{i-1} - \rho_i)\sin\theta_{i-1} + \rho_i \sin\theta \end{cases}$$

$$(\theta_{i-1} \le \theta \le \theta_i)$$

$$\theta_i = \theta_{i-1} + \Delta\theta = \theta_{i-1} + S_i/\rho_i$$

among them, the coordinates of the virtual center of the arc of segment I are (Oix,Oiy), and Si, $\rho_i$ and $\theta_i$ are the arc length, curvature radius, and virtual center corner of I respectively; by converting the strain of each fiber into a curve, the curvature of the connecting rod can be reconstructed; and Step B-3: comparing a bending curve and an acceleration change curve, when both curves are obviously bent, the pipe is bent, and its curvature is subject to the data of the connecting rod.

* * * * *